United States Patent
Eisaman

(10) Patent No.: US 9,937,471 B1
(45) Date of Patent: Apr. 10, 2018

(54) RECYCLE LOOP FOR REDUCED SCALING IN BIPOLAR MEMBRANE ELECTRODIALYSIS

(71) Applicant: X Development LLC, Mountain View, CA (US)

(72) Inventor: Matthew Eisaman, Port Jefferson, NY (US)

(73) Assignee: X Development LLC, Mountain View, CA (US)

( * ) Notice: Subject to any disclaimer, the term of this patent is extended or adjusted under 35 U.S.C. 154(b) by 307 days.

(21) Appl. No.: 14/971,838

(22) Filed: Dec. 16, 2015

Related U.S. Application Data

(60) Provisional application No. 62/135,943, filed on Mar. 20, 2015.

(51) Int. Cl.
- *B01D 61/46* (2006.01)
- *B01D 61/52* (2006.01)
- *B01D 61/44* (2006.01)

(52) U.S. Cl.
CPC ........... *B01D 61/52* (2013.01); *B01D 61/445* (2013.01); *B01D 61/46* (2013.01);
(Continued)

(58) Field of Classification Search
None
See application file for complete search history.

(56) References Cited

U.S. PATENT DOCUMENTS

| | | |
|---|---|---|
| 7,655,193 B1 | 2/2010 | Rau et al. |
| 7,947,239 B2 | 5/2011 | Lackner et al. |

(Continued)

FOREIGN PATENT DOCUMENTS

| | | |
|---|---|---|
| EP | 1276795 | 3/2006 |
| EP | 2074066 | 7/2009 |

(Continued)

OTHER PUBLICATIONS

Eisaman, Matthew D., et al., "CO2 extraction from seawater using bipolar membrane electrodialysis", Electronic Supplementary Material (ESI) for Environmental Science, The Royal Society of Chemistry, (2012), 1-4.

(Continued)

*Primary Examiner* — Arun S Phasge
(74) *Attorney, Agent, or Firm* — Christensen O'Connor Johnson Kindness PLLC

(57) ABSTRACT

A method including introducing seawater into an electrodialysis unit including at least one cell including a basified solution compartment, a bipolar membrane, an acidified solution compartment and an anion exchange membrane; acidifying the seawater; removing acidified seawater from the acidified solution compartment; removing $CO_2$ from the acidified seawater to form a decarbonized seawater; introducing the decarbonized seawater into the basified solution compartment of the electrodialysis unit. A system including an electrodialysis unit including an acidified solution compartment, a basified solution compartment, a bipolar membrane, an input to the acidified solution compartment and an input to the basified solution compartment; and a desorption unit coupled to an output of the acidified solution compartment, the desorption unit operable to remove $CO_2$ from a solution from the acidified solution unit, the desorption unit including a solution output that is coupled to the input to the basified solution compartment.

14 Claims, 3 Drawing Sheets

(52) U.S. Cl.
CPC .. *B01D 2311/18* (2013.01); *B01D 2311/2653* (2013.01); *B01D 2313/90* (2013.01)

(56) References Cited

U.S. PATENT DOCUMENTS

| | | | |
|---|---|---|---|
| 8,313,557 | B2 | 11/2012 | Willauer et al. |
| 8,337,589 | B2 | 12/2012 | Wright et al. |
| 8,778,156 | B2 | 7/2014 | Eisaman et al. |
| 8,784,632 | B2 | 7/2014 | Eisaman et al. |
| 8,999,171 | B2 | 4/2015 | Wallace et al. |
| 9,586,181 | B2 * | 3/2017 | Eisaman .............. B01D 61/445 |
| 2008/0033338 | A1 | 2/2008 | Smith |
| 2009/0001020 | A1 | 1/2009 | Constantz et al. |
| 2010/0233767 | A1 | 9/2010 | McMurran |
| 2010/0288700 | A1 | 11/2010 | Lahav et al. |
| 2011/0135551 | A1 | 6/2011 | House et al. |
| 2011/0177550 | A1 | 7/2011 | McMurran |
| 2011/0224578 | A1 | 9/2011 | Edman et al. |
| 2012/0211421 | A1 | 8/2012 | Self et al. |
| 2012/0220019 | A1 | 8/2012 | Lackner et al. |
| 2012/0244053 | A1 | 9/2012 | Self et al. |
| 2013/0008792 | A1 | 1/2013 | Eisaman et al. |
| 2013/0034760 | A1 | 2/2013 | Otts et al. |
| 2013/0343981 | A1 | 12/2013 | Wright et al. |
| 2014/0002788 | A1 | 1/2014 | Otts et al. |
| 2014/0272639 | A1 | 9/2014 | Zietlow |
| 2014/0303452 | A1 | 10/2014 | Ghaffari |

FOREIGN PATENT DOCUMENTS

| | | |
|---|---|---|
| EP | 2465600 | 6/2012 |
| EP | 2465601 | 6/2012 |
| EP | 2543427 | 1/2013 |
| WO | WO-9412465 | 6/1994 |

OTHER PUBLICATIONS

Eisaman, Matthew D., et al., "$CO_2$ separation using bipolar membrane electrodialysis", Energy & Environmental Science, vol. 4, No. 4, (Apr. 2011), 1319-1328.

* cited by examiner

RECYCLE LOOP FOR REDUCED SCALING IN BIPOLAR MEMBRANE ELECTRODIALYSIS

CROSS-REFERENCE TO RELATED APPLICATION

The application claims the benefit of the earlier filing date of U.S. Provisional Patent Application No. 62/135,943, filed Mar. 20, 2015 and incorporated herein by reference.

FIELD

Carbon dioxide separation and collection.

BACKGROUND

The separation of carbon dioxide ($CO_2$) from a mixed-gas source may be accomplished by a capture and regeneration process. More specifically, the process generally includes a selective capture of $CO_2$, by, for example, contacting a mixed-gas source with a solid or liquid adsorber/absorber followed by a generation or desorption of $CO_2$ from the adsorber/absorber. One technique describes the use of bipolar membrane electrodialysis for $CO_2$ extraction/removal from potassium carbonate and bicarbonate solutions.

For capture/regeneration systems, a volume of gas that is processed is generally inversely related to a concentration of $CO_2$ in the mixed-gas source, adding significant challenges to the separation of $CO_2$ from dilute sources such as the atmosphere. $CO_2$ in the atmosphere, however, establishes equilibrium with the total dissolved inorganic carbon in the oceans, which is largely in the form of bicarbonate ions ($HCO_3^-$) at an ocean pH of 8.1-8.3. Therefore, a method for extracting $CO_2$ from the oceans would effectively enable the separation of $CO_2$ from atmosphere without the need to process large volumes of air.

SUMMARY

A method of extracting and collecting carbon dioxide gas from seawater including introducing seawater into an electrodialysis unit including at least one cell comprising a basified solution compartment, a bipolar membrane, an acidified solution compartment and an anion exchange membrane. The seawater is introduced into the at least one acidified solution compartment and the method provides that the seawater is acidified (e.g., by the application of a voltage to the at least one cell) to generate acidified seawater including dissolved carbon dioxide gas (e.g., carbon dioxide in solution). The acidified seawater is removed from the acidified solution compartment and carbon dioxide is removed from the acidified seawater to form a decarbonized seawater. The decarbonized seawater is then introduced into the at least one basified solution compartment of the electrodialysis unit to provide an input solution that has a lower pH than untreated seawater (pH 8.3 or less) to minimize mineral deposition (e.g., scale build up) in the electrodialysis unit.

DETAILED DESCRIPTION

Figure 1:
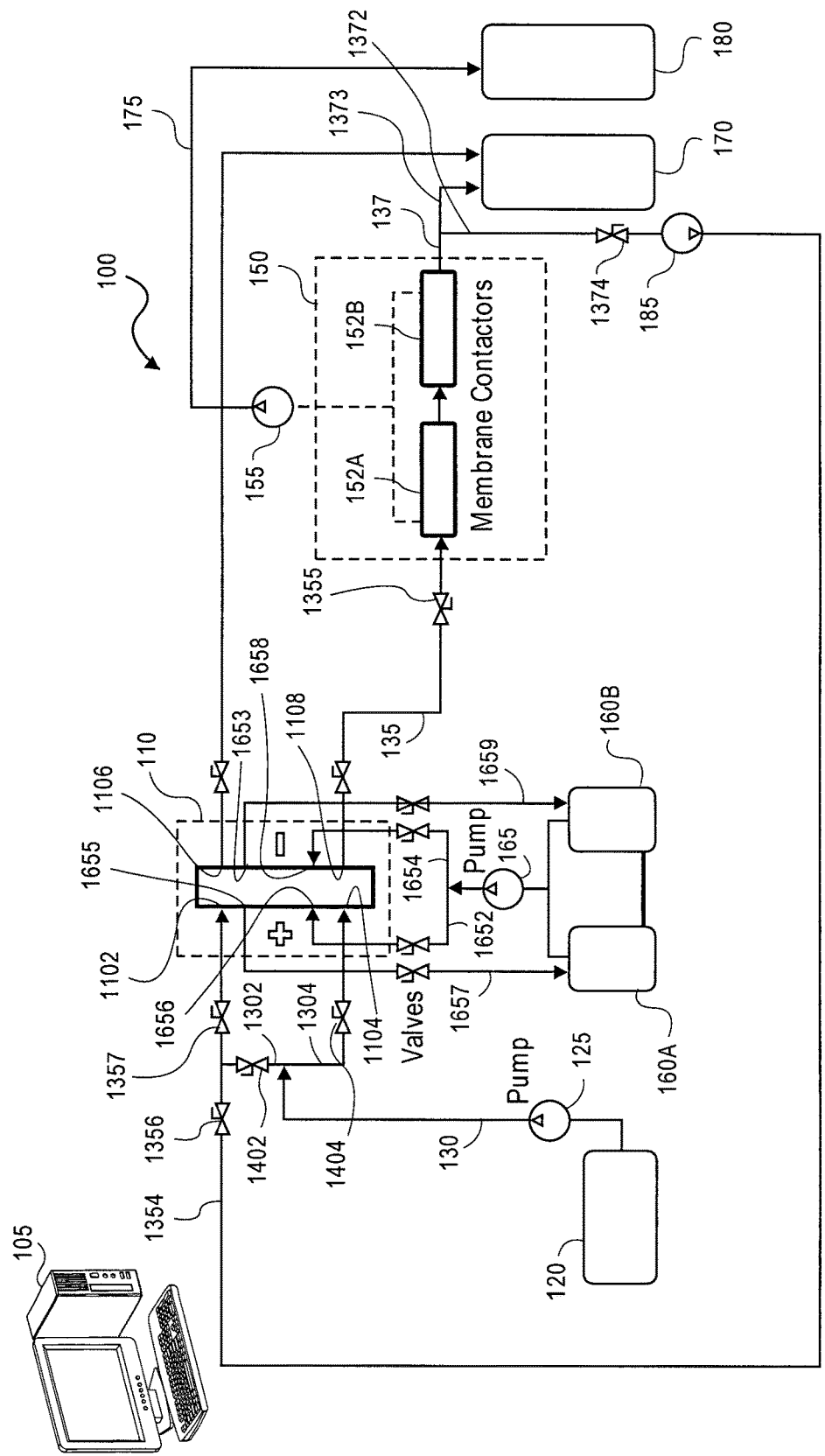
FIG. 1 shows a schematic side view of a system operable to extract (remove) carbon dioxide ($CO_2$) from seawater.

FIG. 1 presents a schematic representation of a system operable to extract/remove $CO_2$ from seawater. Referring to FIG. 1, the system includes a BPMED unit that, in one embodiment, is a multi-cell membrane stack that in the presence of an electric field converts seawater (a salt solution) into two separate output streams: acidified seawater and basified seawater. Specifically, the reactions indicative of $CO_2$ formation are:

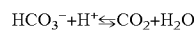

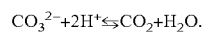

$CO_2$ gas is then desorbed (e.g., vacuum stripped or removed with the aid of a sweep gas) and collected from a portion of the acidified seawater solution output from the BPMED unit and the acidified seawater is recycled as an input to the BPMED unit. The recycled acidified seawater is introduced into the one or more basified solution compartments of the BPMED. Acidified seawater has a pH on the order of 4 to 6 which is less than a typical pH of seawater (pH 8.1 to 8.3). By introducing a seawater solution that has a reduced pH of all the solutions in BPMED unit 110 are kept below pH 8.3 making it less likely to produce scaling (mineral deposition of, for example, calcium and magnesium) compared to the use of fresh seawater as an input to the basified solution compartments which results in a pH of pH9-11 at the output of the basified solution compartment(s). The acidified seawater may be introduced along into a base input of the BPMED (100 percent acidified) or may be combined with untreated seawater (e.g., 50 percent acidified seawater with 50 percent untreated seawater; 70 percent acidified seawater with 30 percent untreated seawater; 30 percent acidified seawater with 70 percent untreated seawater).

Referring to FIG. 1, system 100 includes input tank 120 having a volume that is operable to contain a volume of seawater (on the order of pH 8). Seawater from input tank 120 is pumped using pump 125 through conduit 130 toward BPMED unit 110. Prior to reaching BPMED unit 110, conduit 130 is divided into two separate conduits: conduit 1302 and conduit 1304 to feed base input 1102 and acid input 1104 of BPMED unit 110, respectively. Base input 1102 feeds basified solution compartments within BPMED unit 110 and acid input 1104 feeds acidified solution compartments within the unit. In one embodiment, system 100 includes valve 1402 in conduit 1302 to control a flow of seawater from input tank 120 into base input 1102 and valve 1404 in conduit 1304 to control a flow of seawater from input tank 120 into acid input 1104.

Figure 2:
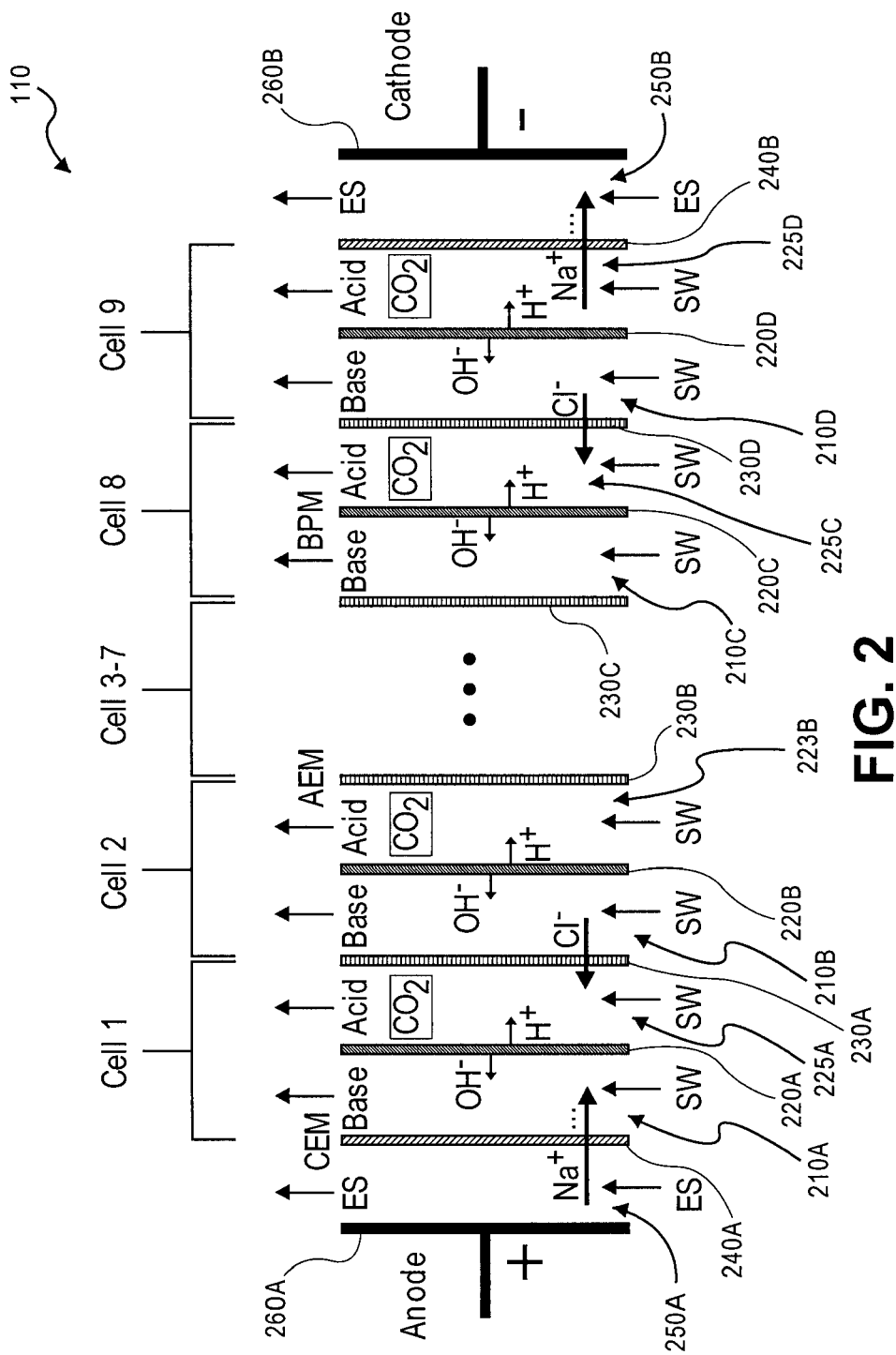
FIG. 2 shows a cross-sectional side view of an embodiment of a bipolar membrane electrodialysis unit in the system of FIG. 1.

FIG. 2 shows a cross-section of an embodiment of BPMED unit 110. In this embodiment, the unit representatively consists of nine cells in series, with each cell including a basified solution compartment (compartments 210A, 210B, 210C and 210D illustrated); a bipolar membrane such as Neosepta BP-1E, commercially available from Ameridia Corp. (BPM 220A, 220B, 220C and 220D illustrated); an acidified solution compartment; and an anion exchange membrane (AEM), such as Neosepta ACS, commercially available from Ameridia Corp. (AEM 230A, 230B, 230C and 230D illustrated). At each end of the membrane stack, a cation exchange membrane (CEM) such as AEM, Neosepta CMX-S, commercially available from Ameridia Corp.

is used to separate the membrane stack from electrode compartment (CEM 240A and CEM 240B are illustrated separating the membrane stack from electrode compartment 250A and electrode compartment 250B, respectively). Broadly speaking, under an applied voltage, water dissociation inside the bipolar membrane and the ion-selective membranes including a bipolar membrane will result in the transport of $H^+$ ions from one side of the bipolar membrane, and $OH^-$ ions from the opposite side. AEMs/CEMs, as their names suggest, allow the transport of negatively/positively charged ions through the membrane. The properties of these membranes such as electrical resistance, burst strength, and thickness are provided by the manufacturer (e.g., Neosepta ACS and CMX-S are monovalent-anion and monovalent-cation permselective membranes, respectively). In one embodiment, BPMED unit 110 includes electrodes 260A and 260B of, for example, titanium with an iridium-ruthenium based coating manufactured by De Nora Tech Inc. The solution compartments between adjacent membranes (basified solution compartments 210A-210D and acidified solution compartments 225A-225D) are filled with polyethylene mesh spacers (e.g., 762 µm thick polyethylene mesh spacers), and these compartments are sealed against leaks using axial pressure and 794 mm thick EPDM rubber gaskets. Each membrane has a representative active area of 180 $cm^2$.

Referring again to the system illustrated in FIG. 1, there are two outputs from BPMED unit 110. FIG. 1 shows base solution output 1106 through which a basified solution is discharged and acid solution output 1108 through which an acidified solution is discharged (acidified seawater). The acidified solution contains dissolved $CO_2$. The acidified solution discharged from acid solution output 1108 is delivered to conduit 135 connected to the output.

In addition to the introducing seawater in system 100, an electrode solution is pumped through anode and cathode compartments of BPMED unit 110, respectively. In one embodiment, a suitable electrode solution is a 0.1 molar $H_2SO_4$/0.25 molar $Na_2SO$ solution. FIG. 1 shows electrode solution tanks 160A and 160B each having a volume operable to contain an electrode solution or solutions. The electrode solution is pumped by pump 165 into conduit 1652 and conduit 1654 that are connected to electrode solution input port 1656 and electrode solution input port 1658 of BPMED unit 110 associated with an anode and a cathode, respectively. The electrode solution flows through an anode compartment and a cathode compartment of BPMED unit 110 and exits BPMED unit 110 through electrode solution output port 1655 and electrode solution output port 1653, respectively. The electrode solution is returned to electrode solution tank 160A and electrode solution tank 160B through conduit 1657 and conduit 1659, respectively. Any gases present in the anode and cathode output electrode solutions may be separately vented before recombining the solutions in the electrode solution tank.

To extract/remove $CO_2$ from seawater, the acidified seawater removed from (exiting) BPMED unit 110 is directed to desorption unit 150 through conduit 135. In one embodiment, desorption unit 150 includes one or more membrane contactors (contactor 152A and contactor 152B illustrated). A suitable membrane contactor is a Liqui-Cel®X50 fibre type 2.5×8 membrane contactor commercially available from Membrana of Charlotte, N.C. Each membrane contactor has an inlet and an outlet for vacuum and an inlet and an outlet for the liquid solution to allow vacuum stripping of $CO_2$ from the acidified seawater solution. FIG. 1 shows conduit 135 to deliver acidified seawater to desorption unit 150 with valve 1355 controlling such input and vacuum pump 155 to pull a vacuum and extract remove $CO_2$ in gaseous form from the acidified seawater. $CO_2$ gas is removed and transferred through conduit 175 to collection tank 180. The acidified seawater solution is removed from (exits) desorption unit 150 through conduit 137. In one embodiment, conduit 137 is subsequently divided into conduit 1372 and conduit 1373 to direct the acidified seawater to base input 1102 of BPMED unit 110 and waste tank 170, respectively. FIG. 1 also shows the basified output solution from BPMED unit 110 directed to waste tank 170.

As noted above, the input seawater flow from input tank 120 is initially divided so that a portion of the seawater flows through acidified solution compartments of the BPMED unit and the remainder flows through the basified solution compartments. Once acidified seawater is output from output stream, in one embodiment, a portion of the acidified seawater replaces a portion or all of the input seawater that is introduced into base input 1102 and the basified solution compartment(s) of BPMED unit 110. The acidified seawater may constitute the entire input into the basified solution compartments (100% acidified seawater) or may be combined with seawater from input tank 120 (untreated seawater). A representative amount/volume of acidified seawater to be combined with untreated seawater is an amount to maintain a pH of a solution into the basified solution compartments at pH 7 or less. In one embodiment, an amount/volume of treated seawater to be combined with untreated seawater is 10 percent to 90 percent by volume and, in another embodiment, 30 percent to 90 percent by volume, in a further embodiment, is 50 percent to 90 percent by volume.

In one embodiment, an operation of system 100 described above may be controlled by a controller. FIG. 1 shows controller 105 that may be connected to through wires or wirelessly to various units of system 100 such as pump 125 to transfer seawater into BPMED unit 110 from input tank 120; pump 165 to transfer electrode solution into BPMED unit 110 from electrode solution tanks 160A and 160B; pump 185 to transfer a portion of acidified seawater into base input 1102 of BPMED unit 110; and vacuum pump 155 to extract $CO_2$ gas from desorption unit 150 and transfer such gas to storage tank 180. Variable pumps (IDNM 3534 motor and VS1MX Microdrive, Baldor Electric Company) and valves are used to control the flow rate and pressure of seawater and electrode solution. In addition to the described pumps, in one embodiment, controller 105 is connected to various valves to control the flow of liquids and gases through the system. Representatively, controller 105 is connected to valves 1402 and 1404 to control the flow of seawater from input tank 120 into base input 1102 and acid input 1104 of BPMED unit 110, respectively, as well as valve 1356 to control the flow of acidified seawater into base input 1102. Other valves that are representatively controlled by controller 105 include valves positioned in conduit at the output side of BPMED unit 110 including, but not limited to, valve 1355, valve 1357 and valve 1374 to control the flow of the acidified seawater output from BPMED unit 110 to desorption unit 150 and base input 1102.

Figure 3:
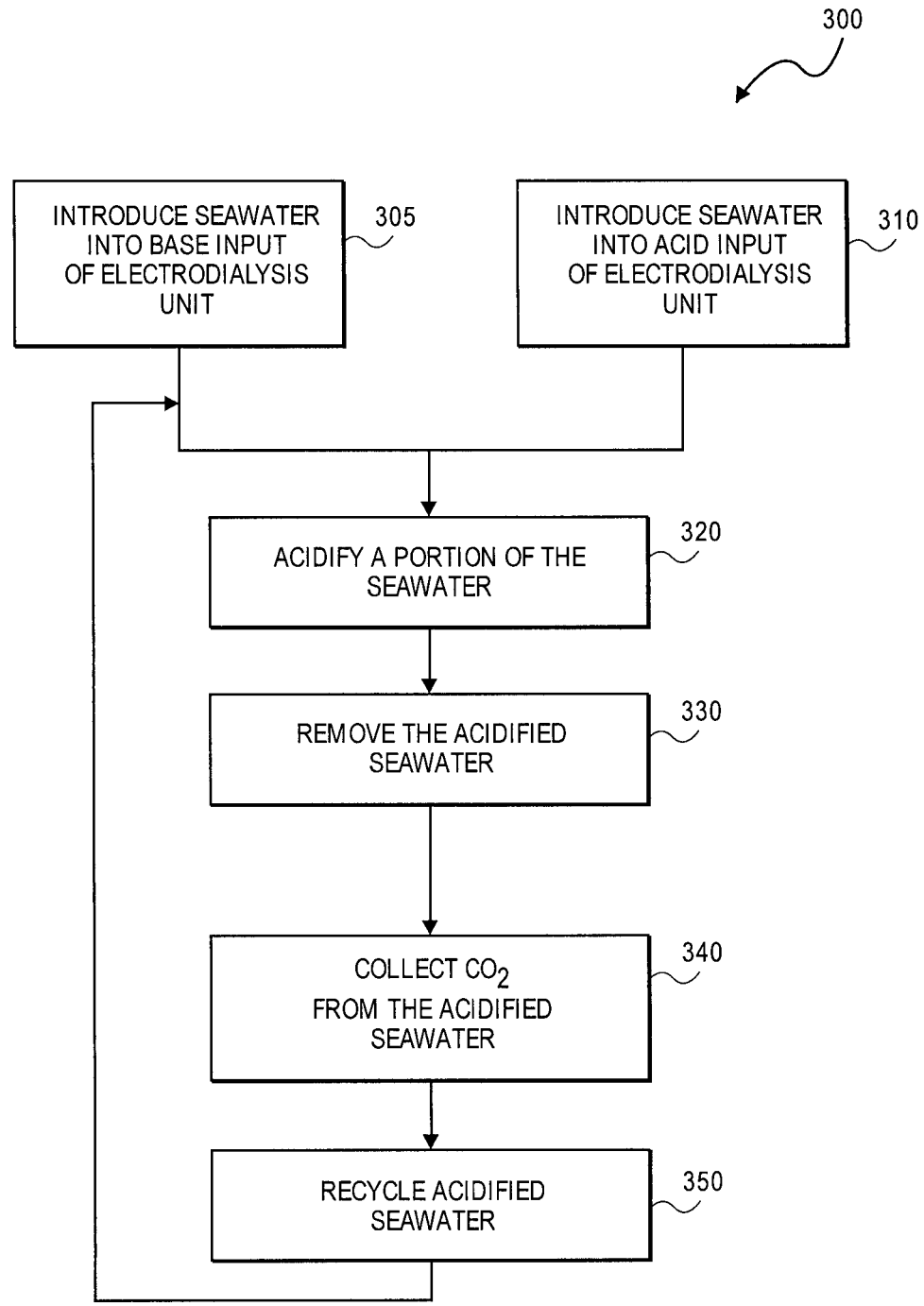
FIG. 3 presents a flow chart of a representative method of extracting $CO_2$ from seawater.

In one embodiment, controller 105 contains machine-readable program instructions as a form of non-transitory media. In one embodiment, the program instructions perform a method of extracting and collecting $CO_2$ from seawater. FIG. 3 presents a flow chart of a representative method. Referring to FIG. 3, method 300 describes introducing seawater into a base input (block 305) of an electrodialysis unit such as BPMED unit 110 (FIG. 1) and introducing seawater into an acid input (block 310) of the unit. The program instructions associated with controller 105 direct, for example, the opening of valves 1402 and 1403 and the operation of pump 125 to transfer the seawater from input tank 120. The program instructions similarly control the introduction of electrode solution into the electrodialysis unit and a control of current through the unit to acidify seawater introduced into an acidified solution compartment of the electrodialysis unit (seawater introduced into the acid input) (block 320). The acidified seawater being removed from (exiting) the electrodialysis unit (block 330) is then directed to a desorption unit (e.g., desorption unit 150, FIG. 1) where $CO_2$ is extracted/separated and subsequently collected (block 340). After $CO_2$ desorption, a selected portion of the decarbonized acidified seawater is directed into the base input of the electrodialysis unit (block 350). With reference to FIG. 1, program instructions associated with controller 105 direct valves 1356, 1357 and 1374 to open and pump 185 to pump acidified seawater into base input 1102 of BPMED unit 110. At the same time, the instructions may partially close or completely close valve 1402 to limit or halt the flow of seawater from input tank 120.

In one embodiment, controller 105 also regulates and monitors the system. Such regulation and monitoring may be accomplished by a number of sensors throughout the system that either send signals to controller 105 or are queried by controller 105. For example, with reference to BPMED unit 110, such monitors may include one or more pH gauges associated with base input 1102 and acid input 1104 as well as one or more pH gauges associated with basified solution compartments and acidified solution compartments within BPMED unit 110 (see FIG. 2) or at basified seawater output 1106 and acidified seawater output 1108. A pressure among all the compartments in BPMED unit 110 is monitored to avoiding mechanical damage to the BPMED membrane stack and the unwanted mixing of different solution streams within the membrane stack. Other monitors include one or pressure monitors associated with BPMED unit 110 to minimize the expulsion of gases within the unit.

The above-described system may be used to collect $CO_2$ from seawater or any other liquid source. Such collection may serve to reduce a concentration of $CO_2$ in the atmosphere and also provide a source of $CO_2$ may be used in various industries, including, but not limited to, as a fuel source.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
   introducing seawater into an electrodialysis unit comprising at least one cell comprising a basified solution compartment, a bipolar membrane, an acidified solution compartment and an anion exchange membrane, wherein the seawater is introduced into the acidified solution compartment;
   acidifying the seawater;
   removing acidified seawater from the acidified solution compartment;
   removing $CO_2$ from the acidified seawater to form a decarbonized seawater; and
   introducing the decarbonized seawater into the basified solution compartment of the electrodialysis unit.

2. The method of claim 1, wherein acidifying the seawater comprises applying a voltage to the at least one cell.

3. The method of claim 1, wherein the electrodialysis unit comprises cells with a bipolar membrane (BPM) compartment, a cation exchange membrane (CEM), and an anion exchange membrane (AEM), and where in addition to an acid and a base stream, a desalinated stream also exits from the electrodialysis unit.

4. The method of claim 1, wherein removing the $CO_2$ from the acidified seawater comprises vacuum stripping of the $CO_2$ from the acidified seawater.

5. The method of claim 4, further comprising capturing the $CO_2$.

6. The method of claim 1, further comprising introducing untreated seawater with the decarbonized seawater into the basified solution compartment of the electrodialysis unit.

7. A method comprising:
   introducing sea water into an electrodialysis unit comprising at least one cell comprising a basified solution compartment and an acidified solution compartment and an anion exchange membrane, wherein the seawater is introduced into the acidified solution compartment;
   acidifying the seawater to generate carbon dioxide ($CO_2$);
   removing acidified seawater from the acidified solution compartment;
   removing the $CO_2$ from the acidified seawater to form decarbonized seawater;
   introducing in a first instance, untreated seawater into the basified solution compartment of the electrodialysis unit and, in a second instance, the decarbonized seawater into the basified solution compartment of the electrodialysis unit; and
   collecting the $CO_2$.

8. The method of claim 7, wherein removing the $CO_2$ from the acidified seawater comprises vacuum stripping of the $CO_2$ from the acidified seawater.

9. The method of claim 7, wherein in the second instance, introducing both the untreated seawater and the decarbonized seawater into the basified solution compartment.

10. A system comprising:
   an electrodialysis unit comprising an acidified solution compartment, a basified solution compartment, a bipolar membrane, an input to the acidified solution compartment and an input to the basified solution compartment; and
   a desorption unit coupled to an output of the acidified solution compartment, the desorption unit operable to remove $CO_2$ from a solution from the acidified solution compartment, the desorption unit comprising a solution output that is coupled to the input to the basified solution compartment.

11. The system of claim 10, wherein the electrodialysis unit comprises a seawater source coupled to the input to the acidified solution compartment.

12. The system of claim 10, wherein the electrodialysis unit comprises an untreated seawater source coupled to the input to the basified solution compartment.

13. The system of claim 12, wherein the system is operable to introduce a solution from the untreated seawater source along with a solution from the desorption unit solution output into the basified solution compartment.

14. The system of claim 12, further comprising a controller operable to control the flow of a solution from the untreated seawater source and a solution from the desorption unit solution output into the basified solution compartment.

* * * * *